(12) United States Patent
Blum et al.

(10) Patent No.: US 8,108,344 B2
(45) Date of Patent: Jan. 31, 2012

(54) METHOD AND SYSTEM FOR MAINTAINING CURRENT DATA FOR WIRELESS DEVICES

(75) Inventors: Adam Blum, Los Gatos, CA (US); Cliff Draper, Emerald Hills, CA (US); Terry Ngo, Sunnyvale, CA (US)

(73) Assignee: Motorola Mobility, Inc., Libertyville, IL (US)

( * ) Notice: Subject to any disclaimer, the term of this patent is extended or adjusted under 35 U.S.C. 154(b) by 10 days.

(21) Appl. No.: 12/621,996

(22) Filed: Nov. 19, 2009

(65) Prior Publication Data

US 2010/0070472 A1 Mar. 18, 2010

Related U.S. Application Data

(63) Continuation of application No. 11/298,079, filed on Dec. 8, 2005, now Pat. No. 7,631,017.

(51) Int. Cl.
G06F 7/00 (2006.01)

(52) U.S. Cl. .................. 707/625; 707/634; 719/328

(58) Field of Classification Search .................. 707/617, 707/618, 620, 621, 622, 625, 610, 634; 719/318, 719/328
See application file for complete search history.

(56) References Cited

U.S. PATENT DOCUMENTS

| | | | |
|---|---|---|---|
| 6,611,849 B1 * | 8/2003 | Raff et al. ............................. 1/1 |
| 7,353,227 B2 | 4/2008 | Wu | |
| 2003/0204624 A1 | 10/2003 | Kushner | |
| 2004/0054793 A1 * | 3/2004 | Coleman ........................ 709/229 |
| 2004/0153459 A1 | 8/2004 | Whitten et al. | |
| 2004/0153576 A1 * | 8/2004 | Hansmann et al. ............ 709/248 |
| 2005/0044165 A1 | 2/2005 | O'Farrell et al. | |
| 2005/0165758 A1 * | 7/2005 | Kasten et al. ....................... 707/3 |
| 2005/0172034 A1 | 8/2005 | Sakai et al. | |
| 2005/0260979 A1 | 11/2005 | Draluk et al. | |
| 2006/0117073 A1 | 6/2006 | Bosworth et al. | |
| 2006/0136517 A1 | 6/2006 | Creamer et al. | |
| 2006/0218224 A1 | 9/2006 | Agrawal et al. | |
| 2007/0180075 A1 * | 8/2007 | Chasman et al. .............. 709/223 |

FOREIGN PATENT DOCUMENTS

| | | |
|---|---|---|
| EP | 1569136 | 8/2005 |
| WO | WO 2005096187 | 10/2005 |
| WO | WO 2005114489 | 12/2005 |

OTHER PUBLICATIONS

"Letter from Foreign Associate including the European Search Report", *Letter from Foreign Associate mailed Oct 22, 2009 including the European Search Report dated Oct. 14, 2009*, 18 pages.

(Continued)

*Primary Examiner* — Amy Ng
(74) *Attorney, Agent, or Firm* — Aslam A. Jaffery; Blakely, Sokoloff, Taylor & Zafman, LLP; Sylvia Chen

(57) ABSTRACT

A system includes a server to receive a request representing changes to data residing at a device. The request is received from the device that is coupled to the server. The server includes a first synchronizer to identify the changes via web services description. The server further includes a second synchronizer to synchronize the identified changes with the data at the device to update the data at the device.

19 Claims, 5 Drawing Sheets

OTHER PUBLICATIONS

"PCT International Search Report and Written Opinion of the International Searching Authority", *International Application No. PCT/US06/47146; Good Technology, Inc.*, (Mar. 20, 2008), 8 pages.

Christensen, E., et al., "Web Service Description Language (WSDL) 1.1", *Internet Citation (online) XP002203550 Retrieved from the Internet:URL:http://www.w3/org/TR/wsdl>retrieved on Jun. 26, 2002*, pp. 1-28.

Glass, Graham, "The Web Services (r)evolution Part 4. Web Services Description Language (WSDL)", *Internet Citation (Online) XP002247117 Retrieved from the Internet URL:ftp://www6.software,ibm,com/software/developer/library/ws-peer4.pdf>* [*retrieved on Jul. 10, 2003*], 11 pages.

Lei, Hui, et al., "DataX: an Approach to Ubiquitous Database Access", *Mobile Computing Systems and Applications 1999. Proceeding WMCSA '9. 9. Second IEEE Workshop on New Orleans, LA USA*, Feb. 25-26, 1999 Los Alamitos, CA USA IEEE. Comput. Soc, US, Feb. 25, 1999 pp. 70-79 XP010323393 ISBN:978-0-7695-0025-6.

\* cited by examiner

METHOD AND SYSTEM FOR MAINTAINING CURRENT DATA FOR WIRELESS DEVICES

RELATED APPLICATION

This application is a Continuation Application of U.S. application Ser. No. 11/298,079, entitled METHOD AND SYSTEM FOR MAINTAINING CURRENT DATA FOR WIRELESS DEVICES, filed on Dec. 8, 2005 now U.S. Pat. No. 7,631,017, now allowed, and priority is claimed thereof.

FIELD

This invention relates generally to the field of network data services. More particularly, the invention relates to a method and system for maintaining current data for wireless devices.

BACKGROUND

A variety of wireless data processing devices have been introduced over the past several years. These include wireless personal digital assistants ("PDAs") such as the Treo 650 handheld, cellular phones equipped with data processing capabilities (e.g., those which include wireless application protocol ("WAP") support), and, more recently, wireless messaging devices.

With the rise in the use of wireless devices, having the data of interest on such wireless devices as current as possible is becoming increasingly important; yet it is cumbersome. For example, the conventional way of updating data on the wireless device requires all data be synchronized and the changes be made directly to the database. Such changes to the database require the wireless device to be online. Furthermore, changes, such as triggers, procedure calls, queries, etc., being applied directly to the database can cause to destabilize the system (e.g., server) which could be problematic to mission critical systems. The problem is further exasperated with the amount of data to be updated is relatively large, such as when dealing with enterprise business data.

SUMMARY

In one embodiment, a system is disclosed for maintaining current data for wireless devices. The system includes a server to receive a request representing changes to data residing at a device. The request is received from the device that is coupled to the server over a wireless network. The server includes a first synchronizer to identify the changes via web services description. The first synchronizer includes a business record synchronizer. The server further includes a second synchronizer to download the identified changes to the device to update the data at the device. The downloading of the changes includes synchronizing the identified changes with the data at the device to update the existing data at the device.

In another embodiment, a method for is disclosed. The method includes receiving a request from a device. The request representing changes to data residing at the device. The method further includes identifying the changes via web services description, and synchronizing the identified changes with the data at the device to update data at the device.

BRIEF DESCRIPTION OF THE DRAWINGS

A better understanding of the present invention can be obtained from the following detailed description in conjunction with the following drawings, in which.

DETAILED DESCRIPTION

According to one embodiment a mechanism for monitoring a connection to a wireless device is disclosed. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
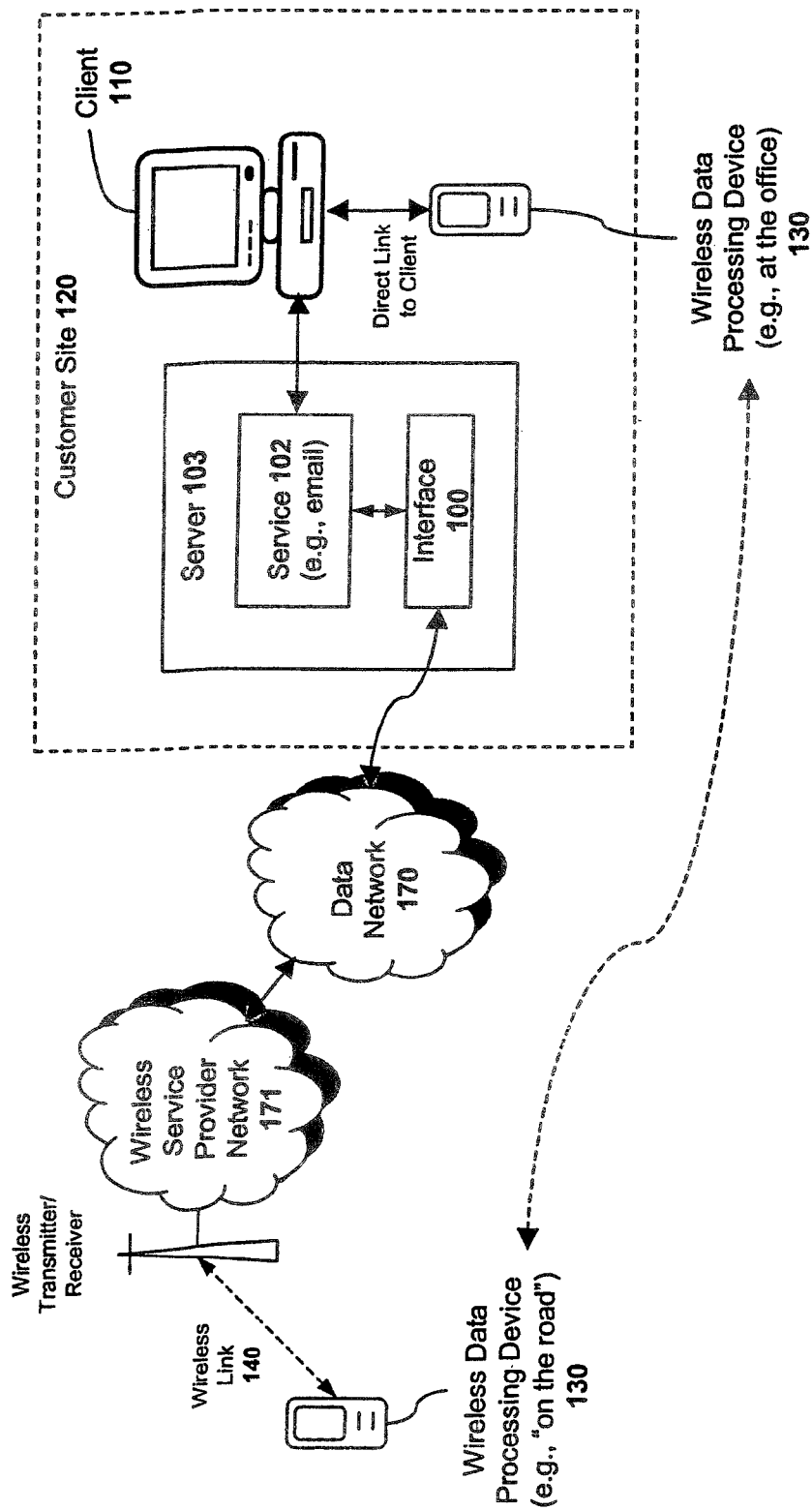
FIG. 1 illustrates an embodiment of a network to implement elements of the present invention.

FIG. 1 illustrates one embodiment of a network architecture. A "customer site" 120 is illustrated in FIG. 1 and may be any local-area or wide-area network over which a plurality of servers 103 and clients 110 communicate. For example, customer site 120 may include all servers and clients maintained by a single corporation.

Servers 103 may provide a variety of different messaging and groupware services 102 to network users (e.g., e-mail, instant messaging, calendaring, etc). However, the underlying principles of the invention are not limited to any particular messaging/groupware platform.

In one embodiment, an interface 100 forwards data objects (e.g., e-mail messages, instant messages, calendar data, etc.) maintained by service 102 to a plurality of wireless data processing devices (represented in FIG. 1 by device 130) via an external data network 170 and/or a wireless service provider network 171. For example, server 103 serves as a proxy for the web service that delivers data on a wireless network to various mobile devices 130.

In one embodiment, interface 100 is a software module adapted to work with the particular service 102. It should be noted, however, that interface 100 may be implemented in hardware or any combination of hardware and software while still complying with the underlying principles of the invention.

In one embodiment, the external data network 170 includes a plurality of databases, servers/clients (not shown) and other networking hardware (e.g., routers, hubs, etc) for transmitting data between the interface 100 and the devices 130. In one embodiment, the interface 100 encapsulates data in one or more packets having an address identifying the devices 130 (e.g., such as a 32-bit Mobitex Access Number ("MAN #")).

The external data network 170 transmits the packets to a wireless service provider network 171, which in turn, transmits the packets (or the data contained therein) over a wireless communication link to the device 130. In one embodiment, the wireless service provider network is a CDMA 2000 network. However, various other network types may be employed (e.g., Mobitex, GPRS, PCS, etc.) while still complying with the underlying principles of the invention.

It should be noted that the network service provider network 171 and the external data network 170 (and associated interface 100) may be owned/operated by the same organization or, alternatively, the owner/operator of the external data network 170 may lease wireless services from the wireless service provider network. The underlying principles of the invention are not limited to any particular service arrangement.

Figure 2:
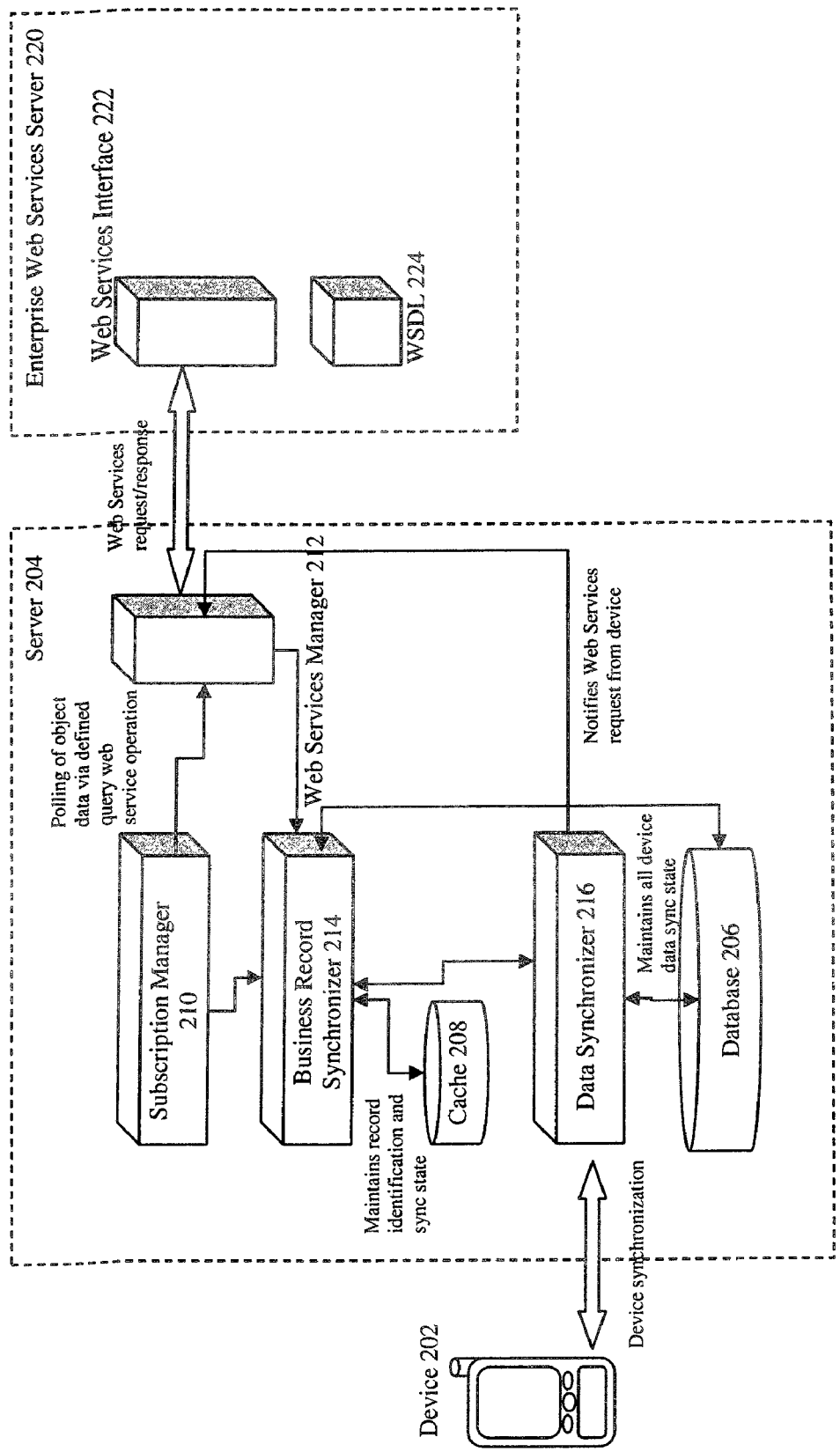
FIG. 2 illustrates an embodiment of an architecture for maintaining current data for wireless devices.

FIG. 2 illustrates an embodiment of an architecture for maintaining current data for wireless devices 202. In the illustrated embodiment, a wireless processing device (device) 202 is coupled to and in communication with server 204. Device 202 includes any device having a mobile computer systems or devices, such as a laptop computer, a mobile telephone (e.g., mobile cellular phones, smartphones, etc.), a personal digital assistant (PDA), a pocket computer, etc. Server 204 is further in communication with an enterprise server (enterprise server) 220 providing web services. It is contemplated that server 204 and an enterprise web services server (WS server) 220 are in communication with each other via a network. Device 202, which can be online or offline, and server 204 are in communication with backend WS server 220 via exposed web services and a web services application. The network may include a local area network (LAN), a wide area network (WAN), a metropolitan area network (MAN), an internet, the Intranet, and the like. Further, the network is coupled to and in communication with a wireless network. Server 204 may include GoodLink™ server, Good Access Web Services (GAWS) server, etc., provided by Good Technology, Inc. of Santa Clara, Calif. Examples of WS server 220 include Web Application Server developed by SAP AG of Walldorf, Germany, and WebSphere Application Server developed by International Business Machines Corp. (IBM®) of Armonk, N.Y.

In one embodiment, server 204 includes subscription manager 210, web services (WS manager) 212, business record synchronizer (business record sync) 214, and data synchronizer (data sync) 216. Data sync 216 includes a generic data synchronizer. Subscription manager 210 is used to manage web services query subscriptions associated with devices 202. For example, subscription manager 210 is used for polling of object data via defined query web service operation. Each query subscription uses a web services call, with arguments, that identifies a group of business data. For example, there can a query that defines a group of high-priority sales accounts. Further, multiple query subscriptions can share the same web service method call with different arguments. Also, in an application, multiple query subscriptions can be defined for each user and/or device 202. Stated differently, several groups of business records per used can be employed.

WS manager 212 handles web service requests and responses (including authentications when making requests) on behalf of device 202. Upon receiving a command (e.g., a periodically triggered command) by the subscription manager 210, WS manager 212 makes an invocation to the web service, retrieves business records, and updates business record sync 214. Business record sync 214 manages the knowledge of record identification and sync state, including any overlapping redundancy of records, for each device 202. Business record sync 214 employs data sync 216 which directly tracks and syncs data on devices 202. Business record sync 214 is used for managing business record identification and changes for subscriptions, which data sync 216 employs database 206 to track and synchronize any data with the device 202.

A user can make changes to data on device 202 either when device 202 is online or offline. The changes can include amending and/or deleting of existing data and/or adding of new data to the existing data. The changes are then recognized at server 204 and are synced by data sync 216 to database 206 for that particular device 202. A server process then invokes the Extensible Markup Language (XML) and Simple Object Access Protocol (SOAP) web services change (e.g., update, deletion, addition, creation, etc.) operations with the user changes at server database 206 as the appropriate XML web service playloads. For example, an administrator or developer can identify a web services change operation during a setup process for that web service using data manager 214 at server 204. These changes will eventually propagate back to business record sync 214 and its cache 208 when the subscription manager 210 runs.

Using web services, business operations available in an XML web service as described by the Web Services Description Language (WSDL) 224 at WS server 220 which contains data description/metadata, necessary business logic is obtained that is typically wrapped around such business operations. Web services provide operations, as described by WSDL 224, used by WS manager 212. These operations as described by WSDL 224 may include query, create, update, and delete operations, collectively referred to as QCUD operations. Query is to be presented to that subscription manager 210 can query data periodically, while create, update, and delete operations are regarded optional. Further, these web services QCUD operations may be implemented via a web services interface 222.

In one embodiment, changes are then reported and made to database 206 and later synchronized with device 202 via synchronizer 216 at server 204. This mechanism may be referred to as downloading of data changes. Downloading of data changes to device 202 via data sync 216 may be done with device 202 is online or disconnected. Database 206 includes data corresponding to multiple devices 202, while cache 208 includes data corresponding to a single device 202. As such, even an occasionally disconnected device 202 can stay current with frequently changing data from backend applications that are exposed via web services via WS server 220.

In one embodiment, the existing data that has been changed in WS server 220. Subscription manager 210 periodically uses WS manager 212 to query web services for data. The response contains records as described by WSDL 224, and these records are identified and extracted from the response using a predefined record boundary XML Path (XPath). XPath refers to a sublanguage in an Extensible Stylesheet Language (XSL) style sheet that is used to identify XML elements for processing. It is also used to calculate numbers and manipulate strings. The record primary key or unique identifier is also identified by XPath if possible. Otherwise, the primary key is calculated as a hash of the record content. The records are then passed on to the business record sync 214 to be recognized which have been changed for the given device 202. Using the cache 208, business record sync 214 can detect what the device 202 currently has and what have changed. Business record sync 214 uses data sync 216 to download the latest changes to device 202.

In one embodiment, data changes are then synchronized with device 202 using data sync 216 at server 204, resulting in downloading of data changes to device 202. As with uploading, merely data changes are downloaded, eliminating the need for downloading all the data to device 202. This mechanism allows device 202 to continue to maintain current or updated data. This is accomplished without having to tie up device processor and bandwidth with continuous processing of large XML query responses from backend web services as merely data changes are uploaded and downloaded, eliminating both large full data updated and small incremental changes which are time consuming and delayed. Moreover, server 204 and its components (e.g., subscription manager 210, WS manager 212, business record sync 214, data sync 216, etc.) are used to keep the data current and updated at device 202 using merely the arbitrary enterprise data without having the need for custom programming.

Figure 3:
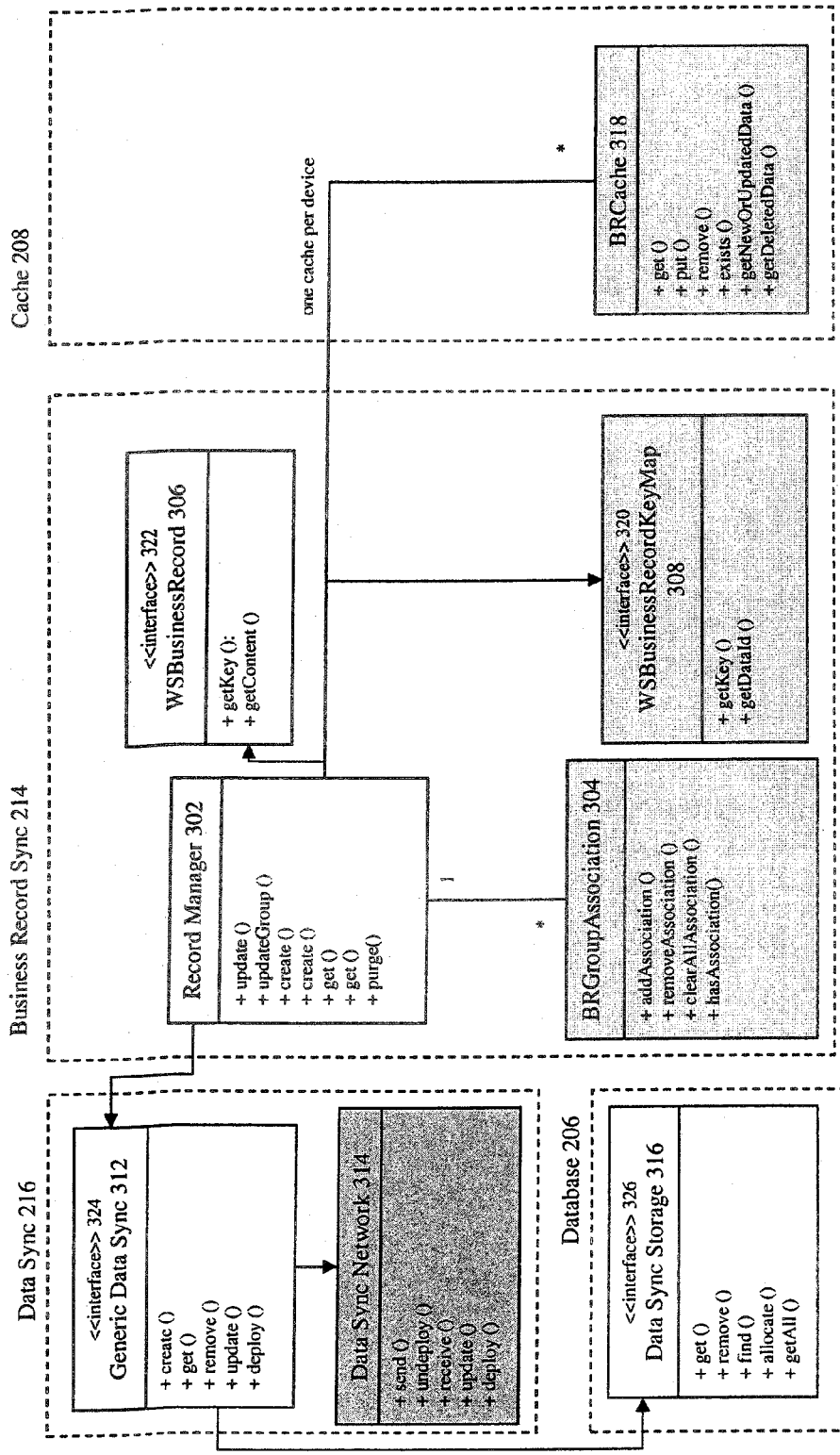
FIG. 3 illustrates an embodiment of an internal structure of business record synchronizer.

FIG. 3 illustrates an embodiment of an internal structure of business record sync 214. As illustrated, business record sync 214 is in communication with cache 208, data sync 216, and database 206. Data sync 216 includes generic data sync 312 in communication with data sync network 314, data sync storage 316 at database 206, and record manager 302 at business record sync 214. Cache 208 includes business record cache 318 in communication with business record sync 214. There may be a single business record cache 318 assigned for each device.

WS business record 306, extracted from web services response, represents a record as it appears or is stored on a wireless device, representing a piece of enterprise data (e.g., account data, product data, customer data, contacts and notes, etc.). A key similar to a primary key in a database is regarded and each row in database can be a record representing a business record. The key identifying a WS business record 306 is extracted from a web services query subscription. It can be identified by an xpath in web services response as configured by the administrator. If not configured, it can be a hash of the content of the WS business record 306. The key can be used to index WS business record 306.

Cache 208 is used for caching of business records 306 such that the knowledge of which data is new, updated, or deleted for a given device or user can be maintained, such as by comparing the existing data to data changes, changes in cache data can be determined. Further, the caching of business records 306 provides a temporary repository of business records 306 and helps achieve better performance. Business record cache 318 is loaded as necessitated (e.g., lazy instantiation). Also, those business records 306 that are not used for a while (as determined by the administrator) can be purged to save memory. Further, no-content proxy records representing those that are already synchronized can also be stored at cache 208, which may eliminate the need for purging business records 306 from business record cache 318.

Users via corresponding devices can register a query specification with business record group association 304 through subscription manager to identify a group of WS business records 306 of interest. Record group association 304 can be used to help avoid replicating record data within each cache 208 associated with the device by determining which group a particular record 306 belongs to or is associated with. Subscription manager can be used to manage various groups for each device. An interface is employed and used for updating record group association 304 of groups to records 306.

For each user space, WS business record key map 308 maintains a bi-directional one-to-one mapping between a record key and its associated data identification (dataID) at the data sync 216. The mapping also persists in a permanent storage and loaded up at startup time. In one embodiment, record group association 304, record cache 310, and WS record key map 308 may not be exposed outside of the record manager package.

As startup or initialization, in one embodiment, record manager 302 is aware of which records 306 are stored at each device. Also, at initialization, not all content available at generic data sync 312 are to be loaded. For example, the following activities may stay hidden or be avoided: (1) loading of the mapping between each synchronizer dataID and record key for each device; (2) loading of any records that startup, but do not demand loading by relying on the dataID-key mapping to help lazy load from synchronizer. A hybrid scheme may be employed to have new or updated record's content kept in memory until it is written to synchronizer; and (3) record group associations 304 can be created on demand. For instance, record manager 302 may work on the assumption that if any of WS business records 306 that are not part of the user's query subscription can be removed from synchronizer, while the dataID-key mapping is accordingly disassociated. Although, record manager 302 may not directly remove any record 306 from web services.

In terms of operations, WS business records 306 may be replicated across wireless devices as the information in memory may be kept on the basis of each corresponding device. Such replication of records 306 can allow for a simpler implementation and synchronization of records 306 and help avoid potential conflicts. Record manager 302 may support the following operation scenarios: (1) create (e.g., creating and/or allocating of dataID and further creating of WS business record 306 as identified by the dataID); (2) read (e.g., accessing the latest version of a record 306 for a given device; (3) update (e.g., allowing a record 306 to be updated); and (4) group update (e.g., updating an entire group of WS business records 306). Record manager 302 may or may not explicitly support the delete operation of record 306. For example, using business record group association 310, the appropriate WS record 306 may be identified for purging from synchronizer. Further, individual record creation or update may leave the record 306 associated with an un-subscribed system group to avoid its automatic deletion. The record 306 can then be automatically transferred to a user-defined group when a group update (e.g., UpdateGroup( )) method identifies such record 306 belonging to a group at record group association 310.

In one embodiment, for each subscription, subscription manager (e.g., subscription manager 210 of FIG. 2) may use WS manager (212 of FIG. 2) to invoke a registered query web services call. The result may then be translated into a group of records by WS manager and a group update operation is then issued to the record manager 302. Through record group association 310, record manager 302 maintains a mapping for each WS business record 306 in one or more groups. Record cache 318 for a given device may transparently maintain one or more of following states for each record 306 when a group is updated: (1) new (e.g., a record 306 is new to server); (2) updated (e.g., content of the changed record 306 is different from what was stored at cache 208); (3) deleted (e.g., record manager 302 determines that a record 306 does not belong in any group that associates with the device; and (4) in synchronization (e.g., IN_SYNC, which refers to business record 306 being already synched with device).

When implementing, in one embodiment, once a group update is issued, a periodical or immediate update of synchronizer can be performed. When performing lazy load for cache, a determination is made as to whether a record is new or not by consulting WS record key map 308 which can indicate whether device or cache has previously known about this record. If device has already had a particular record, the record is loaded and compared to help decide whether the record is new, same, or updated. If the record is the same, it can be inserted into cache with the IN_SYNC state; otherwise, the record is updated and later sent to device.

A record group may be automatically created when calling a group update with a new group identification (e.g., groupID) as described elsewhere in this document. Any subsequent update to the same groupID can automatically trigger an update to device as needed or desired. To remove a group, a call to group update with no records may be sufficient to trigger a removal of data on device. Record manager 302 may serve on behalf of synchronizer for create, read, and update operations for any WS business record 306. As illustrated, record manager 302 may use various components 306-310 and their operations to help perform its functions.

For data changes representing an update, record sync 214 is updated right away. Record sync 214 also provides asynchronous create and update operations. For data changes representing a delete, however, record sync 214 may not be updated right away because the device may have multiple query subscriptions, which means any record 306, which is created independently from any group, may be in another subscription that has yet to be created. Thus, for example, a delayed garbage collection for picking up records for delete operations may be employed, and any record 306 not associated with a group may be deleted right away.

Although record sync 214 may not depend on implementation of record key generation, a single standard implementation may be used for server for consistency. A number of parameters can be used for record key generation, such as type (e.g., type=Account) and key content (e.g., key content=<AccountID>34534097345</AccountID>) can be employed or single implementation combining the type and key content can be used (e.g., key=Account: 34534097345). Further, since the record content is available, a hash code may be created based on the entire content as key. Thus, a change in the record content may result in purge of the old record in favor of a new record or effectively, having an add/delete operation pair in synchronizer. Also, a hash code may be generated with creating a key, including one on the actual user-defined key content and the other one on the record content. This mechanism allows having a simple key-map database, while maintaining the same effect and efficiency. To have a reasonable key size, the developer/administrator may choose to define the key.

WS business record key map 308 may maintain association between a record key and its associated dataID for each device via a WS record key map interface 320. WS record key map 308 is persisted and loaded at initialization. Synchronizer helps maintain this mapping transparently and make the appropriate addition and deletion consistent with the actual data in Synchronizer. The size of record key map 308 can be determined using a formula based on the map size per server using, for example, number devices, average user-defined key size, hash-based key size, average records kept per device, dataID size per map entry, and the like. Further, this mechanism may be flexible enough such that it can be seamlessly altered due to changing requirements or goals without effecting performance levels. Also, a database that is compatible and integratable with server may be used. WS business record 306 includes an interface 322 to provide access to records. Interfaces are also provided for access to other components, such as interface 324 at generic data sync 312 and interface 326 at data sync storage 316.

Figure 4:
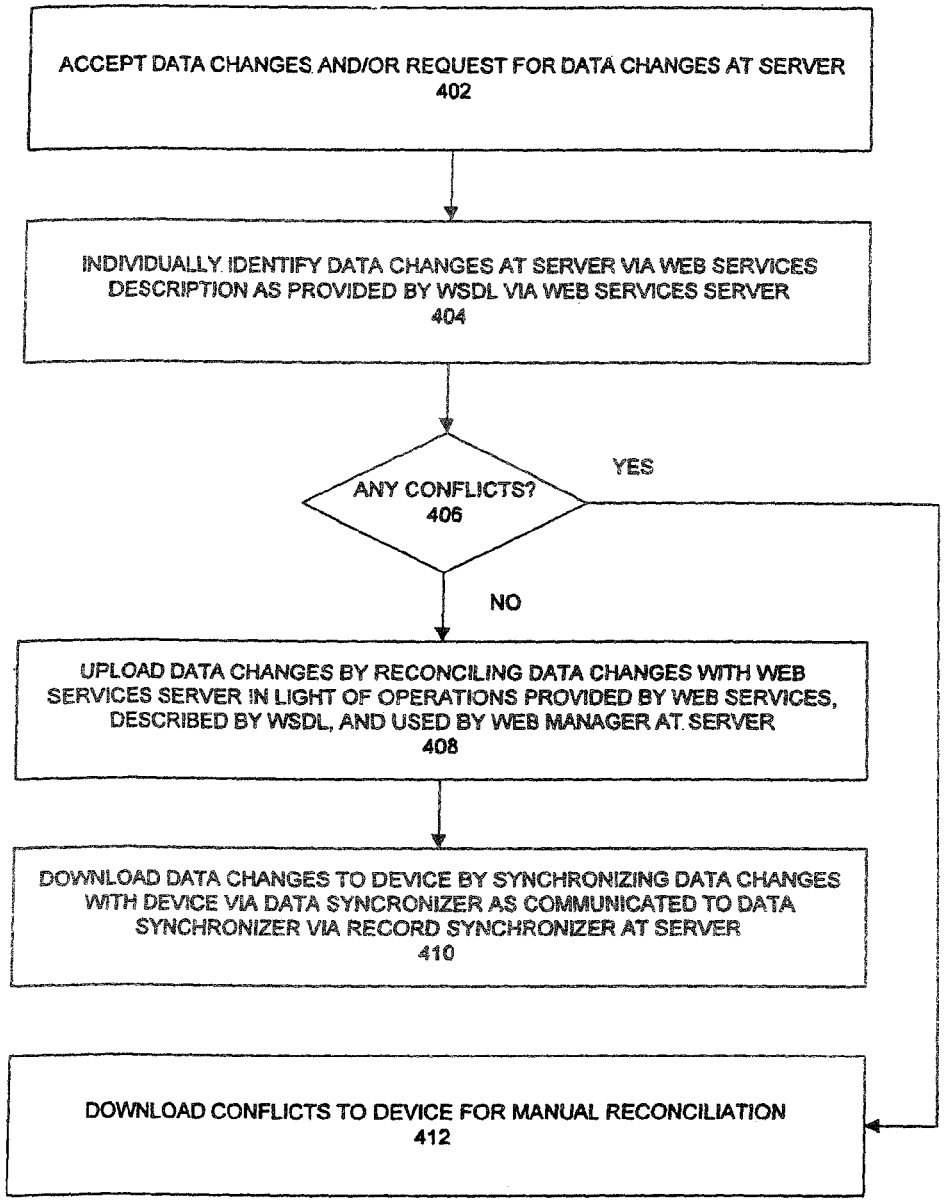
FIG. 4 illustrates a processing for downloading and uploading of data changes.

FIG. 4 illustrates a process for downloading and uploading of data changes. At processing block 402, data changes or request for data changes are accepted at server. Data changes are initiated at a wireless processing device by a user and are transmitted over to server over a network. In one embodiment, a request for data changes is received at server. The request for data changes may be triggered with the user attempting to make changes to the existing data at the device. The request received at server represents data changes requested by the user via device. Data changes are then individually identified at server at processing block 404. Identification may include identifying each record by its individual key, using description or metadata contained in WSDL, and using web service queries. Identification may include identifying the type of change (e.g., addition, deletion, amendment, creation, etc.) made to existing data. For example, whether new data was created and added to existing data and/or changes were made to existing data. These changes may be represented as QCUD operations (e.g., query, create, update, and delete operations) that are provided by web services and described by WSDL at web services server. These QCUD operations are then used by WS manager at server. Data changes may then be stored at server cache.

Identification also includes determining whether there are any conflicts in data changes that are not to be resolved at server at decision block 406. Conflicts may include data changes that cannot be reconciled with the other data changes and/or existing data residing at one or more of server cache, server database, and/or device. If such a conflict exists, it may be downloaded on to device for manual reconciliation with existing data at device at processing block 412. For example, conflicts may include variation in data (e.g., records) due to one or more of inappropriate changes, incorrect changes, unacceptable changes, unrecognized changes, and untimely changes (e.g., making changes to a piece of data that does not exist, making changes that are unacceptable due to system limitations, etc.). For example, users A and B request different changes to a common set of existing data (e.g., the same record or set of records accessible by both user A and B) by accessing devices A and B, respectively.

Let's suppose, device A then stays offline for the next 2 hours because user A is flying from Denver to Los Angeles, while device B stays online and in use by user B. For clarity, assuming there are no other complications or requests placed, in this case, data changes proposed by user B are likely to be accepted at server and downloaded to device B. Device A, instead, receives a conflict or conflict notification. User A may then choose to merge the changes onto device A, overwrite user B's data changes with the previously proposed change or a new change, or simply enter the changes from device B manually at device A.

Referring back to decision block 406, if there are not conflicts, in one embodiment, data changes are uploaded 408. Uploading of data changes may include reconciling data changes with web service server in light of QCUD operations provided by web services and as described by WSDL. Data changes being reconciled with or uploaded to web services server are representative of merely the changes proposed to the existing data at device such that there is no need for uploading all data. Data changes are then reconciled and stored at server database. In one embodiment, a single server cache may be assigned to or correspond with a single wireless device and may contain data that resides at the corresponding device. Server database, in one embodiment, may correspond to several or all wireless devices that are in communication with server and may contain data representing collective data residing at all such devices.

In one embodiment, data changes are then downloaded at processing block 410. Downloading of data changes to device can be performed while device is online, offline, connected, or disconnected. Downloading includes synchronizing data changes with the existing data at device such that the existing data is updated and current. Synchronization of data changes with device is performed using data synchronizer, as data changes are communicated to it by record synchronizer. Furthermore, proposed data change to device, acceptance of data changes, identification of data changes, determination of conflicts, uploading of data changes, storing of data changes at cache and database, and downloading of conflicts may also be performed while device is online, offline, connected, or disconnected. For example, a request for data changes can be placed by the user via a device when the device is online, but the downloading or synchronization of such data changes with the device may occur while the device is offline or disconnected. Similarly, conflicts can be manually resolved by the user once the device comes online, but, prior to that, conflicts can be communicated to the device while the device is offline or disconnected.

Figure 5:
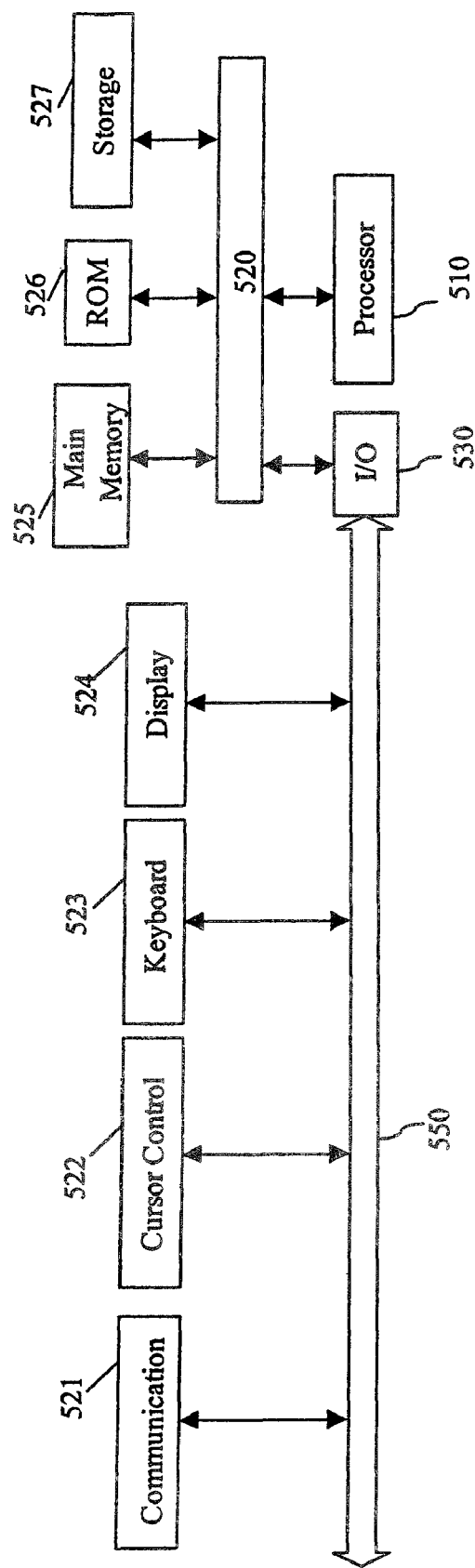
FIG. 5 illustrates an embodiment of a computer system.

FIG. 5 illustrates a computer system 500 on which device 130 and or server 103 may be implemented. Computer system 500 includes a system bus 520 for communicating information, and a processor 510 coupled to bus 520 for processing information. According to one embodiment, processor 510 is implemented using one of the multitudes of Motorola ARM family of processors of microprocessors. Nevertheless one of ordinary skill in the art will appreciate that other processors may be used.

Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and/or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 500 can also be coupled to a second I/O bus 550 via an I/O interface 530. A plurality of I/O devices may be coupled to I/O bus 550, including a display device 524; an input device (e.g., an alphanumeric input device 523 and/or a cursor control device 522).

The communication device 521 is for accessing other computers (servers or clients) via network 170. The communication device 521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, and magnetic or optical cards.

Throughout the foregoing description, for the purposes of explanation, numerous specific details were set forth in order to provide a thorough understanding of the invention. It will be apparent, however, to one skilled in the art that the invention may be practiced without some of these specific details.

For example, while illustrated as an interface 100 to a service 102 executed on a server 103 (see FIG. 1); it will be appreciated that the underlying principles of the invention may be implemented on a single client in which the client transmits data over a network. Accordingly, the scope and spirit of the invention should be judged in terms of the claims which follow.

What is claimed is:

1. A method comprising:
maintaining, via a record manager, a record cache having Web Service (WS) data records, each data record being associated with an identification key that is provided using a key map, the record cache is further to maintain data changes relating to each of the data records, wherein the record manager is aware of device data at computing devices, wherein the record cache resides at an application server of a computer server system, wherein the application server is coupled to a web server and the computing devices; and
performing lazy load for the record cache, wherein lazy loading includes selectively synchronizing, based on a hybrid synchronization scheme, the data records with the device data such that at least a first set of the data records is synchronized, a second set of data records is kept hidden, and a third set of the data records is avoided, wherein lazy loading further includes determining, based on the hybrid synchronization scheme, data changes being proposed to the data records by consulting the key map to extract corresponding identification keys indicating status changes to the data records, wherein determining the data changes includes ascertaining, via web services description or web services queries, a description of the data changes revealing identification of the data changes and the status changes relating to the data changes.

2. The method of claim 1, further comprising providing, via an identification key, the description of the data changes and other relevant information relating to the data changes being proposed to the data records, wherein the data changes are proposed in response to one or more requests for the data changes by one or more computing devices.

3. The method of claim 1, wherein the status changes comprise updating or deleting one or more of the data records or adding a new data record to the data records.

4. The method of claim 1, wherein determining the data changes further comprises:
detecting a data conflict resulting from a data change being requested by a computing device, wherein the conflict occurs between first device data at the computing device and second device data at other computing devices or the data records at the server computer system; and
facilitating a data conflict resolution to the data conflict, the data conflict resolution including an automatic resolution or a manual resolution.

5. The method of claim 4, wherein the data conflict comprises an inappropriate data change, an incorrect data change, an unacceptable data change, an unrecognized data change, or an untimely data change.

6. The method of claim 4, further comprising:
providing a conflict notification relating to the data conflict to the computing device; and
downloading the data conflict on the computing device such that the computing device performs the manual resolution including retrieving the data change or accepting the data change in reconciliation with the second device data.

7. A system comprising:
a server computer system coupled to computing devices, the server computer system including a processor, and an application server coupled to a web server and the computing devices, the application server to:
  maintain, via a record manager, a record cache having Web Service (WS) data records, each data record being associated with an identification key that is provided using a key map, the record cache is further to maintain data changes relating to each of the data records, wherein the record manager is aware of device data at computing devices; and
  perform lazy load for the record cache, wherein lazy loading includes selectively synchronizing, based on a hybrid synchronization scheme, the data records with the device data such that at least a first set of the data records is synchronized, a second set of data records is kept hidden, and a third set of the data records is avoided, wherein lazy loading further includes determining, based on the hybrid synchronization scheme, data changes being proposed to the data records by consulting the key map to extract corresponding identification keys indicating status changes to the data records, wherein determining the data changes includes ascertaining, via web services description or web services queries, a description of the data changes revealing identification of the data changes and the status changes relating to the data changes.

8. The system of claim 7, wherein an identification key provides the description of the data changes and other relevant information relating to the data changes being proposed to the data records, wherein the data changes are proposed in response to one or more requests for the data changes by one or more computing devices, wherein the status changes comprise updating or deleting one or more of the data records or adding a new data record to the data records.

9. The system of claim 7, wherein the application server when determining the data changes is further to:
  detect a data conflict resulting from a data change being requested by a computing device, wherein the conflict occurs between first device data at the computing device and second device data at other computing devices or the data records at the server computer system; and
  facilitate a data conflict resolution to the data conflict, the data conflict resolution including an automatic resolution or a manual resolution.

10. The system of claim 9, wherein the data conflict comprises an inappropriate data change, an incorrect data change, an unacceptable data change, an unrecognized data change, or an untimely data change.

11. The system of claim 9, wherein the application server is further to:
  provide a conflict notification relating to the data conflict to the computing device; and
  download the data conflict on the computing device such that the computing device performs the manual resolution including retrieving the data change or accepting the data change in reconciliation with the second device data.

12. A non-transitory machine-readable storage medium comprising instructions which, when executed, cause a machine to:
  maintain, via a record manager, a record cache having Web Service (WS) data records, each data record being associated with an identification key that is provided using a key map, the record cache is further to maintain data changes relating to each of the data records, wherein the record manager is aware of device data at computing devices, wherein the record cache resides at an application server of a computer server system, wherein the application server is coupled to a web server and the computing devices; and
  perform lazy load for the record cache, wherein lazy loading includes selectively synchronizing, based on a hybrid synchronization scheme, the data records with the device data such that at least a first set of the data records is synchronized, a second set of data records is kept hidden, and a third set of the data records is avoided, wherein lazy loading further includes determining, based on the hybrid synchronization scheme, data changes being proposed to the data records by consulting the key map to extract corresponding identification keys indicating status changes to the data records, wherein determining the data changes includes ascertaining, via web services description or web services queries, a description of the data changes revealing identification of the data changes and the status changes relating to the data changes.

13. The non-transitory machine-readable storage medium of claim 12, wherein the machine is further to provide, via an identification key, the description of the data changes and other relevant information relating to the data changes being proposed to the data records, wherein the data changes are proposed in response to one or more requests for the data changes by one or more computing devices, wherein the status changes comprise updating or deleting one or more of the data records or adding a new data record to the data records.

14. The non-transitory machine-readable storage medium of claim 12, wherein the instructions which, when executed to determine the data changes, further cause the machine to:
  detect a data conflict resulting from a data change being requested by a computing device, wherein the conflict occurs between first device data at the computing device and second device data at other computing devices or the data records at the server computer system; and
  facilitate a data conflict resolution to the data conflict, the data conflict resolution including an automatic resolution or a manual resolution.

15. The non-transitory machine-readable medium of claim 14, wherein the data conflict comprises an inappropriate data change, an incorrect data change, an unacceptable data change, an unrecognized data change, or an untimely data change.

16. The non-transitory machine-readable medium of claim 14, wherein the instructions which, when executed, further cause the machine to:
  provide a conflict notification relating to the data conflict to the computing device; and
  download the data conflict on the computing device such that the computing device performs the manual resolution including retrieving the data change or accepting the data change in reconciliation with the second device data.

17. The method of claim 1, wherein hybrid synchronization scheme-based selective synchronization comprises:
  selectively loading a mapping scheme of synchronizer data identifications (IDs) and their corresponding record keys for each computing device, loading, using the mapping scheme, one or more data records that start up but do not demand being loaded, or recording group associations that can be created on-demand, preserving content of each data record in memory until the content is written to a synchronizer.

18. The system of claim 7, wherein hybrid synchronization scheme-based selective synchronization comprises:
selectively loading a mapping scheme of synchronizer data identifications (IDs) and their corresponding record keys for each computing device, loading, using the mapping scheme, one or more data records that start up but do not demand being loaded, or recording group associations that can be created on-demand, preserving content of each data record in memory until the content is written to a synchronizer.

19. The non-transitory machine-readable medium of claim 12, wherein hybrid synchronization scheme-based selective synchronization comprises selectively loading a mapping scheme of synchronizer data identifications (IDs) and their corresponding record keys for each computing device, loading, using the mapping scheme, one or more data records that start up but do not demand being loaded, or recording group associations that can be created on-demand, preserving content of each data record in memory until the content is written to a synchronizer.

* * * * *